United States Patent
Kendall

(10) Patent No.: US 10,232,779 B2
(45) Date of Patent: Mar. 19, 2019

(54) EXTERIOR MIRROR WITH HEATER PAD

(71) Applicant: MAGNA MIRRORS OF AMERICA, INC., Holland, MI (US)

(72) Inventor: Craig Kendall, Grand Haven, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 15/722,149

(22) Filed: Oct. 2, 2017

(65) Prior Publication Data

US 2018/0022279 A1    Jan. 25, 2018

Related U.S. Application Data

(63) Continuation of application No. 15/008,489, filed on Jan. 28, 2016, now Pat. No. 9,776,569.

(60) Provisional application No. 62/109,958, filed on Jan. 30, 2015.

(51) Int. Cl.

| | |
|---|---|
| *B60R 1/08* | (2006.01) |
| *B60R 1/06* | (2006.01) |
| *B60R 1/12* | (2006.01) |
| *G02F 1/163* | (2006.01) |
| *G02F 1/133* | (2006.01) |
| *G02F 1/153* | (2006.01) |

(52) U.S. Cl.
CPC ............ *B60R 1/088* (2013.01); *B60R 1/0602* (2013.01); *B60R 1/1207* (2013.01); *G02F 1/163* (2013.01); *G02F 1/13306* (2013.01); *G02F 1/153* (2013.01); *G02F 2203/60* (2013.01)

(58) Field of Classification Search
USPC .................................. 359/267–275; 345/105
See application file for complete search history.

(56) References Cited

U.S. PATENT DOCUMENTS

| | | |
|---|---|---|
| 4,721,364 A | 1/1988 | Itoh et al. |
| 4,773,740 A | 9/1988 | Kawakami et al. |
| 4,793,690 A | 12/1988 | Gahan et al. |
| 4,826,289 A | 5/1989 | Vandenbrink et al. |
| 4,827,086 A | 5/1989 | Rockwell |
| 4,855,550 A | 8/1989 | Schultz, Jr. |

(Continued)

FOREIGN PATENT DOCUMENTS

| | | |
|---|---|---|
| WO | WO2006/124682 | 11/2006 |
| WO | WO2007/005942 | 1/2007 |

*Primary Examiner* — Tuyen Tra
(74) *Attorney, Agent, or Firm* — Honigman LLP

(57) ABSTRACT

A rearview mirror reflective element assembly includes a mirror reflective element, a heater pad, and a back plate. The heater pad includes a heater pad substrate having a plurality of electrically conductive traces established thereat, with the electrically conductive traces including (i) a heating trace that, when powered, heats the heater pad substrate and the mirror reflective element, and (ii) an accessory trace that, when powered, controls an accessory of the mirror reflective element assembly. The electrically conductive traces may include electro-optic control traces that, when electrically powered, darken the mirror reflective element. The heater pad is disposed between the mirror reflective element and the back plate. The accessory trace, when powered, controls a blind zone indicator that is disposed at the rear of the mirror reflective element and that is viewable, when powered, through the mirror reflective element.

20 Claims, 3 Drawing Sheets

(56) References Cited

U.S. PATENT DOCUMENTS

| | | |
|---|---|---|
| 4,859,813 A | 8/1989 | Rockwell |
| 4,882,466 A | 11/1989 | Friel |
| 5,115,346 A | 5/1992 | Lynam |
| 5,151,824 A | 9/1992 | O'Farrell |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,233,461 A | 8/1993 | Dornan et al. |
| 5,253,109 A | 10/1993 | O'Farrell et al. |
| 5,285,060 A | 2/1994 | Larson et al. |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,371,659 A | 12/1994 | Pastrick et al. |
| 5,406,414 A | 4/1995 | O'Farrell et al. |
| 5,437,931 A | 8/1995 | Tsai et al. |
| 5,446,576 A | 8/1995 | Lynam et al. |
| 5,481,409 A | 1/1996 | Roberts |
| 5,497,306 A | 3/1996 | Pastrick |
| 5,509,606 A | 4/1996 | Breithaupt et al. |
| 5,523,877 A | 6/1996 | Lynam |
| 5,525,264 A | 6/1996 | Cronin et al. |
| 5,535,056 A | 7/1996 | Caskey et al. |
| 5,550,677 A | 8/1996 | Schofield et al. |
| 5,567,360 A | 10/1996 | Varaprasad et al. |
| 5,575,552 A | 11/1996 | Faloon et al. |
| 5,587,236 A | 12/1996 | Agrawal et al. |
| 5,587,699 A | 12/1996 | Faloon et al. |
| 5,594,222 A | 1/1997 | Caldwell |
| 5,607,538 A | 3/1997 | Cooke |
| 5,610,380 A | 3/1997 | Nicolaisen |
| 5,610,756 A | 3/1997 | Lynam et al. |
| 5,649,756 A | 7/1997 | Adams et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,689,370 A | 11/1997 | Tonar et al. |
| 5,724,187 A | 3/1998 | Varaprasad et al. |
| 5,751,489 A | 5/1998 | Caskey et al. |
| 5,786,772 A | 7/1998 | Schofield et al. |
| 5,788,357 A | 8/1998 | Muth et al. |
| 5,790,298 A | 8/1998 | Tonar |
| 5,808,777 A | 9/1998 | Lynam et al. |
| 5,823,654 A | 10/1998 | Pastrick et al. |
| 5,877,897 A | 3/1999 | Schofield et al. |
| 5,910,854 A | 6/1999 | Varaprasad et al. |
| 5,922,176 A | 7/1999 | Caskey |
| 5,929,786 A | 7/1999 | Schofield et al. |
| 5,938,320 A | 8/1999 | Crandall |
| 6,001,486 A | 12/1999 | Varaprasad et al. |
| 6,005,724 A | 12/1999 | Todd |
| 6,065,840 A | 5/2000 | Caskey et al. |
| 6,111,684 A | 8/2000 | Forgette et al. |
| 6,154,306 A | 11/2000 | Varaprasad et al. |
| 6,164,564 A | 12/2000 | Franco et al. |
| 6,172,613 B1 | 1/2001 | DeLine et al. |
| 6,176,602 B1 | 1/2001 | Pastrick et al. |
| 6,178,034 B1 | 1/2001 | Allemand et al. |
| 6,196,688 B1 | 3/2001 | Caskey et al. |
| 6,198,409 B1 | 3/2001 | Schofield et al. |
| 6,207,083 B1 | 3/2001 | Varaprasad et al. |
| 6,227,689 B1 | 5/2001 | Miller |
| 6,245,262 B1 | 6/2001 | Varaprasad et al. |
| 6,257,746 B1 | 7/2001 | Todd et al. |
| 6,260,608 B1 | 7/2001 | Kim |
| 6,276,821 B1 | 8/2001 | Pastrick et al. |
| 6,286,965 B1 | 9/2001 | Caskey et al. |
| 6,310,611 B1 | 10/2001 | Caldwell |
| 6,318,870 B1 | 11/2001 | Spooner et al. |
| 6,320,282 B1 | 11/2001 | Caldwell |
| 6,329,925 B1 | 12/2001 | Skiver et al. |
| 6,356,376 B1 | 3/2002 | Tonar et al. |
| 6,420,036 B1 | 7/2002 | Varaprasad et al. |
| 6,428,172 B1 | 8/2002 | Hutzel et al. |
| 6,441,964 B1 | 8/2002 | Chu et al. |
| 6,449,082 B1 | 9/2002 | Agrawal et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,582,109 B2 | 6/2003 | Miller |
| 6,595,649 B2 | 7/2003 | Hoekstra et al. |
| 6,615,438 B1 | 9/2003 | Franco et al. |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,697,024 B2 | 2/2004 | Fuerst et al. |
| 6,717,109 B1 | 4/2004 | Macher et al. |
| 6,719,215 B2 | 4/2004 | Drouillard |
| 6,737,629 B2 | 5/2004 | Nixon et al. |
| 6,742,904 B2 | 6/2004 | Bechtel et al. |
| 6,824,281 B2 | 11/2004 | Schofield et al. |
| 6,831,268 B2 | 12/2004 | Bechtel et al. |
| 6,834,969 B2 | 12/2004 | Bade et al. |
| 6,882,287 B2 | 4/2005 | Schofield |
| 7,004,592 B2 | 2/2006 | Varaprasad et al. |
| 7,004,593 B2 | 2/2006 | Weller et al. |
| 7,038,577 B2 | 5/2006 | Pawlicki et al. |
| 7,042,616 B2 | 5/2006 | Tonar et al. |
| 7,106,392 B2 | 9/2006 | You |
| 7,184,190 B2 | 2/2007 | McCabe et al. |
| 7,244,912 B1 | 7/2007 | Rawlings |
| 7,255,451 B2 | 8/2007 | McCabe et al. |
| 7,287,868 B2 | 10/2007 | Carter et al. |
| 7,400,435 B2 | 7/2008 | Byers et al. |
| 7,581,859 B2 | 9/2009 | Lynam |
| 7,720,580 B2 | 5/2010 | Higgins-Luthman |
| 7,858,905 B2 | 12/2010 | Rawlings |
| 7,881,496 B2 | 2/2011 | Camilleri et al. |
| 7,944,371 B2 | 5/2011 | Foote et al. |
| 8,058,977 B2 | 11/2011 | Lynam |
| 8,242,896 B2 * | 8/2012 | Lynam ............... B60R 1/1207 340/425.5 |
| 8,786,704 B2 | 7/2014 | Foote et al. |
| 9,776,569 B2 | 10/2017 | Kendall |
| 2002/0126054 A1 | 9/2002 | Fuerst et al. |
| 2002/0154379 A1 | 10/2002 | Tonar et al. |
| 2003/0043589 A1 | 3/2003 | Blank |
| 2004/0032638 A1 | 2/2004 | Tonar et al. |
| 2004/0165248 A1 | 8/2004 | Tonar |
| 2006/0050018 A1 | 3/2006 | Hutzel et al. |
| 2011/0286096 A1 | 11/2011 | Dykhouse |

* cited by examiner

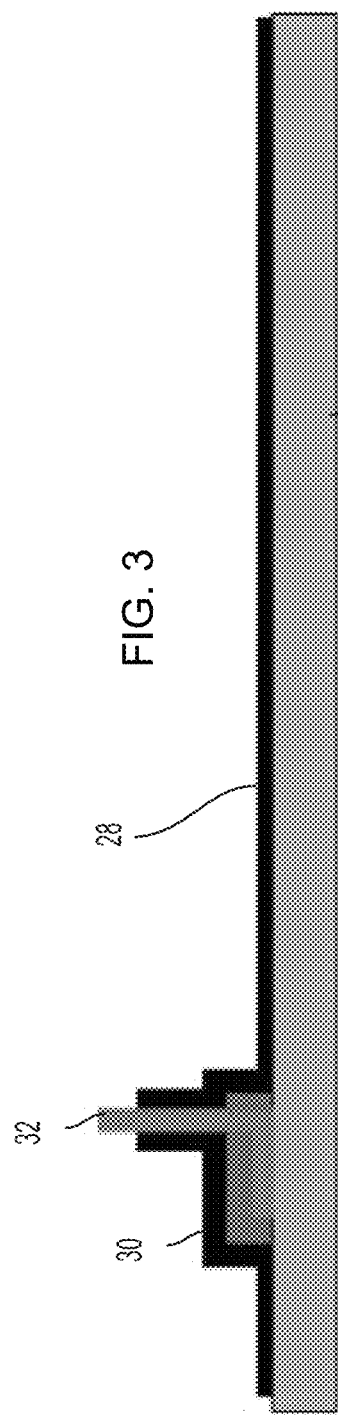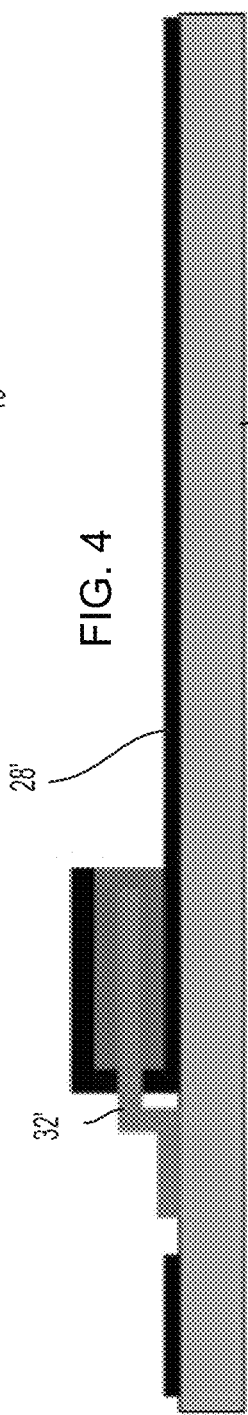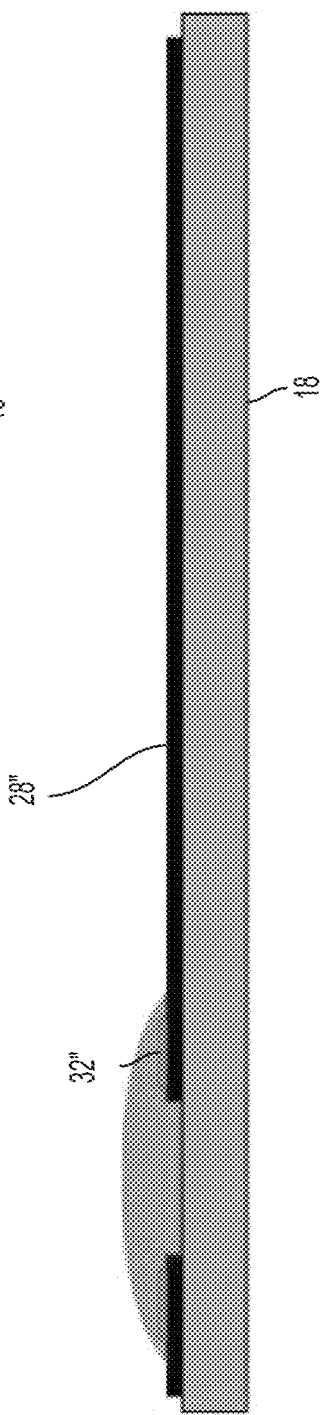

EXTERIOR MIRROR WITH HEATER PAD

CROSS REFERENCE TO RELATED APPLICATIONS

The present application is a continuation of U.S. patent application Ser. No. 15/008,489, filed Jan. 28, 2016, now U.S. Pat. No. 9,776,569, which claims the filing benefits of U.S. provisional application Ser. No. 62/109,958, filed Jan. 30, 2015, which is hereby incorporated herein by reference in its entirety.

FIELD OF THE INVENTION

The present invention relates generally to exterior rearview mirror assemblies for vehicles and, more particularly, to vehicular exterior rearview mirror assemblies having a heater pad at the rear of the reflective element.

BACKGROUND OF THE INVENTION

Reflective element assemblies for exterior rearview mirror assemblies of vehicles may include a heater pad disposed at the rear of the mirror reflective element to limit icing or fogging of the mirror reflective element. Examples of known heater pads are described in U.S. Pat. Nos. 8,058,977; 7,400,435 and 5,808,777, which are hereby incorporated herein by reference in their entireties. For applications where the mirror assembly comprises an electrochromic reflective element and/or a blind zone indicator or the like, each electrical function of the mirror assembly or reflective element assembly (such as the heater pad, EC control, blind zone indicator and the like) is electrically connected to a respective wiring harness of the mirror assembly.

SUMMARY OF THE INVENTION

The present invention provides a heater pad for an electro-optic (such as electrochromic or EC or liquid crystal) mirror reflective element for an exterior rearview mirror assembly. The heater pad comprises a substrate that is adhered at the back of the reflective element (such as at the back of a back plate at the rear of the reflective element) and includes a plurality of electrically conductive traces established on the substrate. The electrically conductive traces include (i) a heating trace that, when powered, heats the substrate and the reflective element, and (ii) EC cell or electro-optic control traces that, when powered, dim or darken the electro-optic (such as electrochromic or EC or liquid crystal) cell. The traces terminate at a common or centralized connector portion, where a single connector can electrically connect to the electrically conductive traces. Optionally, the exterior rearview mirror assembly may include a blind zone indicator (or turn signal indicator or the like), and the electrically conductive traces of the heater pad may include blind zone indicator (BZI) traces that, when powered, power or control the blind zone indicator, with the BZI traces terminating at the common or centralized connector portion.

Thus, the present invention provides a heater pad that includes traces or circuits for powering and/or controlling multiple accessories or functions of the reflective element assembly and/or mirror assembly. The traces at the heater pad thus are utilized not just to heat the mirror reflective element, but additional traces or circuits are established at or added to the heater pad for the EC Cell and/or Blind Zone Indicator and/or optionally for other systems as well, such as a side assist system (SWA) and/or headlamp control (HC) (such as a trace or circuit for powering or controlling or communicating with a light sensor or glare sensor disposed at the rear of the reflective element) and/or turn signal indicator and/or illumination modules and/or the like, whereby the heater pad circuit and other circuits established at the heater pad can be powered and/or controlled via a single electrical connection at the rear of the reflective element and heater pad, such as via electrical connection of a single wire harness of the mirror assembly. Such a single electrical connection reduces the costs associated with the mirror assembly by eliminating other electrical connectors of known mirrors and eases or enhances the assembly of the mirror by eliminating multiple process steps associated with electrically connecting multiple wire harness or leads of known mirrors.

These and other objects, advantages, purposes and features of the present invention will become apparent upon review of the following specification in conjunction with the drawings.

BRIEF DESCRIPTION OF THE DRAWINGS

FIGS. 3-5 are sectional views of the reflective element assembly of the present invention, showing different electrical connectors for electrically connecting at the centralized connector of the heater pad.

DESCRIPTION OF THE PREFERRED EMBODIMENTS

Figure 1:
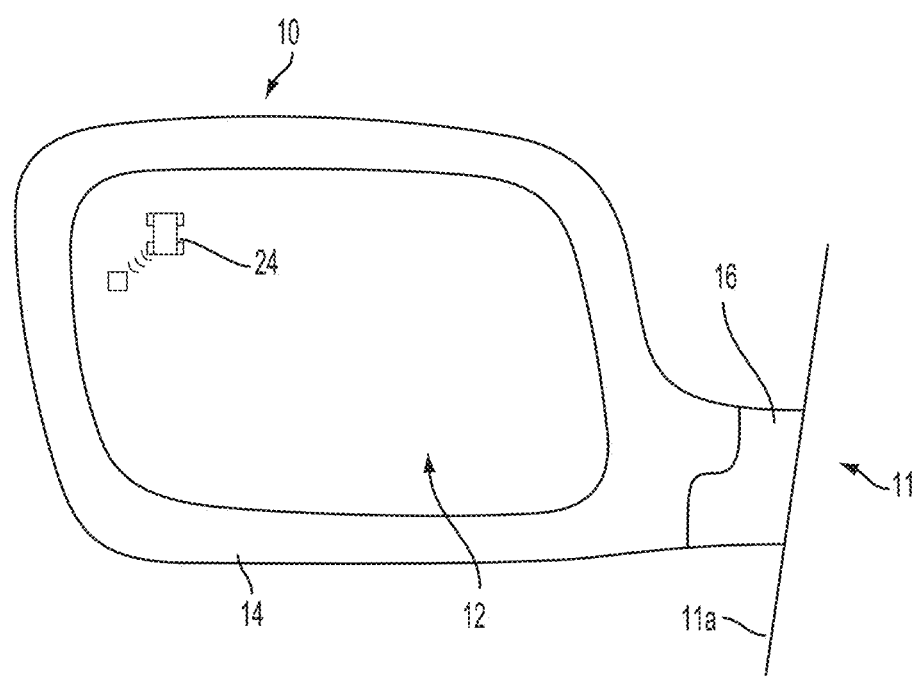
FIG. 1 is a plan view of an exterior rearview mirror assembly with a reflective element assembly in accordance with the present invention.

Referring now to the drawings and the illustrative embodiments depicted therein, an exterior rearview mirror assembly 10 for a vehicle includes a mirror reflective element assembly 12 received in and/or supported by a mirror shell or casing 14 (FIG. 1). Mirror assembly 10 is mounted at the side 11a of a host or subject vehicle 1, such as via a mounting arm or mount 16. Mirror reflective element 12 includes a heater pad 18 (FIG. 2), which includes a plurality of electrically conductive traces 20 (such as metallic traces) established on the heater pad substrate (such as a flexible pad that is thermally conductive and that may adhere or otherwise attach at the rear of the reflective element, such as can be seen in FIGS. 3-5). The traces 20 provide respective functions (such as heater pad function, and EC cell control or dimming function and/or the like) and terminate at a centralized connector portion or region 22 of the heater pad, whereby a single electrical connection is made to the vehicle or mirror wiring harness during assembly of the mirror.

Figure 2:
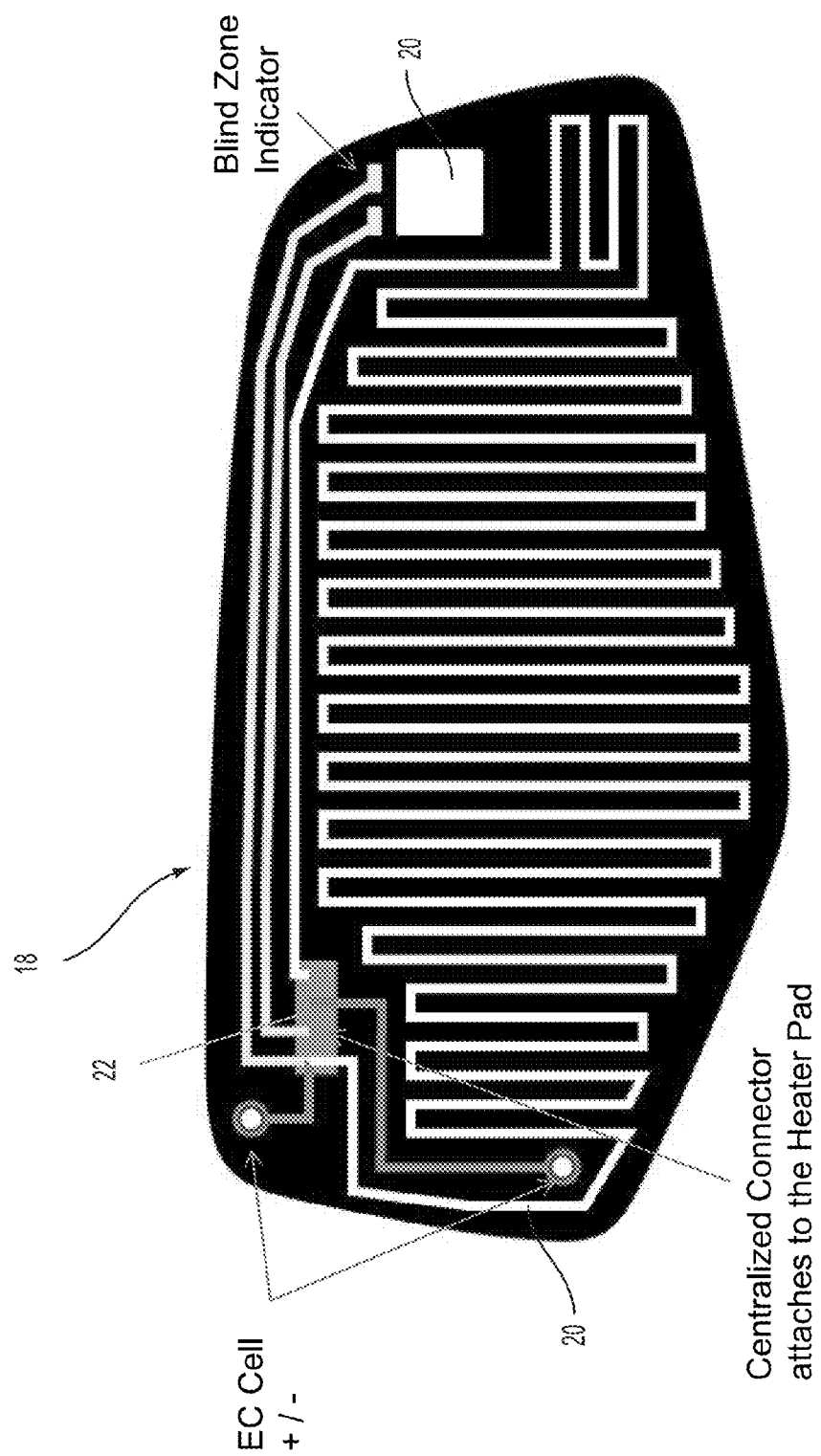
FIG. 2 is a plan view of a heater pad having a plurality of electrically conductive traces and a common or centralized connector in accordance with the present invention.

In the illustrated embodiment, the electrically conductive traces include a heater pad trace, an electro-optic trace and a blind zone indicator trace. As shown in FIG. 2, the heater pad has both terminals or ends (a positive end and a negative end) at the centralized connector region 22, with the trace established substantially over the heater pad substrate in a desired pattern. Thus, when the heater pad trace is powered (via power applied at the respective terminals at the centralized connecting region, the electrically conductive and resistive trace generates heat and heats the substrate and the reflective element over a substantial portion of the surface area of the reflective element.

The electrically conductive traces 20 also include traces for powering or controlling dimming of the electro-optic reflective element 12. For example, a positive trace may be established between a terminal or end at the centralized connecting region 22 and a lower perimeter region (where it may electrically connect or contact a terminal or busbar at the rear or fourth surface of the reflective element), while a negative trace may be established between a separate terminal or end at the centralized connecting region 22 (and optionally at the negative terminal or end of the heater pad trace) and an upper perimeter region (where it may electrically connect or contact a terminal or busbar at the rear or fourth surface of the reflective element).

In the illustrated embodiment, the electrically conductive traces 20 also include a blind zone indicator trace for powering or controlling a blind zone indicator 24 (FIG. 1) that is disposed at the rear of the reflective element and viewable (when powered) through the reflective element. For example, a positive trace may be established between a terminal or end at the centralized connecting region 22 and a positive terminal by an opening or aperture 26 established through the heater pad substrate for the blind zone indicator (where it may electrically connect or contact a terminal of the blind zone indicator when the blind zone indicator is disposed at the aperture), while a negative trace may be established between a separate terminal or end at the centralized connecting region 22 (and optionally at the negative terminal or end of the heater pad trace and negative terminal of the EC trace) and a negative terminal by the opening or aperture 26 (where it may electrically connect or contact a terminal of the blind zone indicator when the blind zone indicator is disposed at the aperture).

Although shown and described as a blind zone indicator, clearly other types of indicators or light sources or modules may also or otherwise be disposed at the reflective element and powered or controlled by respective traces established at the heater pad substrate between the centralized connector region and the region at which the indicator or light source or module is disposed at the rear of the reflective element. Optionally, for example, a glare sensor (such as a rearward facing glare sensor that receives light from rearward of the mirror assembly through a port or opening along the casing and/or bezel portion and/or through the reflective element of the mirror assembly) circuit or trace and/or an ambient light sensor circuit or trace may be provided on the heater pad in accordance with the present invention.

Optionally, a heater pad in accordance with the present invention may include a heater trace and an accessory trace (or accessory traces) and may be disposed at a non-electro-optic reflective element, such as at a flat or bent glass substrate of a non-dimming or non-electro-optic reflective element. The heater pad thus provides heat at the rear surface of the single glass substrate of the reflective element and also provides power and control to an accessory (such as a blind zone indicator and/or turn signal indicator and/or ambient light sensor and/or glare light sensor and/or the like).

The connecting region may have any suitable connector established thereat, such as a plurality of spade terminals or a multi-pin connector or the like disposed thereat and electrically conductively connected to the respective terminals or ends of the traces (such as via soldering the connector elements to the respective terminals of the traces). Optionally, a connector may be established or formed or disposed at the back plate or attachment plate such that, when the back plate is attached at the reflective element and heater pad (with the heater pad adhered to either the front surface of the back plate or the rear surface of the mirror reflective element), the trace terminals at the centralized connecting region of the heater pad electrically conductively connect to electrical contacts or connectors of the back plate.

For example, and with reference to FIG. 3, the back plate 28 may have a connector portion 30 that receives electrically conductive contacts or elements 32 (which may be insert molded in the back plate during injection molding of a polymeric material to form the back plate, or insert molded into another connector element that attaches at the heater pad), which are electrically conductively connected at respective terminals of the electrically conductive traces of the heater pad 18. As shown in FIG. 3, the electrical contacts 32 may protrude rearward from the back plate for electrical connection to a wiring harness of the mirror assembly. Optionally, and such as shown in FIG. 4, the electrical contacts 32' (which may be insert molded in the back plate during injection molding of a polymeric material to form the back plate, or insert molded into another connector element that attaches at the heater pad) may extend along a rear surface of the back plate 28' (with the back plate forming a receiving connector for electrically connecting to a plug connector or the like of a mirror wiring harness). Optionally, and such as shown in FIG. 5, the electrical contacts 32" may be established at the back plate 28" as solder pads for soldering (or using conductive epoxy or the like) or otherwise individually connecting wires of a wire harness thereto.

Thus, the present invention provides a heater pad with a plurality of circuits or electrically conductive traces established thereat and operable to power or control various functions of the mirror assembly. The traces all terminate at a centralized connecting region of the heater pad, where a single electrical connection can be made to a wiring harness of the mirror assembly. In the illustrated embodiment, the positive terminals or ends of the respective traces terminate at respective portions or terminals of the centralized connecting region, while the negative terminals or ends of the respective traces terminate at a common portion or terminal of the centralized connecting region. Thus, the heater pad of the present invention provides multiple electrical functions that are powered via a single electrical connector at the rear of the reflective element, thus enhancing assembly of the mirror assembly (which typically requires at least one separate electrical connection for each powered accessory of the mirror reflective element assembly), since an operator only has to electrically connect a single wire harness of the mirror assembly to the single centralized connector of the reflective element assembly.

The heater pad or element is disposed at the rear surface of the reflective element to provide heat at the mirror reflective element to defrost or defog or demist the mirror reflective element at the principal reflecting area and at the spotter reflector area. The heater pad or element at the rear surface of the glass substrate may comprise a mirror defrost/demisting heater such as a heater pad or a heater film or a heater element, and may provide an anti-fogging of defogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. Pat. Publication Nos. US-2008-0011733 and/or US-2011-0286096, which are hereby incorporated herein by reference in their entireties.

The centralized connecting portion may have electrical contacts established at or soldered at the terminals of the traces, with the contacts extending rearward from the pad and reflective element for (such as through an aperture of an attaching portion of a back plate) for electrical connection to a wire harness or connector of the mirror assembly (or other suitable electrical connectors may be utilized, such as electrical leads or wire harnesses or pigtails or other separate connectors or cables or the like, which connect to the contacts at the centralized connecting portion or region).

As discussed above, the heater pad may include traces or circuits for a blind zone indicator or turn signal indicator or lane change assist system or the like. For example, the blind zone or signal indicator assembly or indicator module may utilize aspects of the indicators described in U.S. Pat. Nos. 8,786,704; 8,058,977; 7,944,371; 7,581,859; 7,038,577; 6,882,287; 6,198,409; 5,929,786 and/or 5,786,772, and/or International Publication Nos. WO 2007/005942 and/or WO 2006/124682, which are all hereby incorporated herein by reference in their entireties. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786 and/or 5,786,772, and/or of the reverse or backup aid systems, such as the rearwardly directed vehicle vision systems described in U.S. Pat. Nos. 5,550,677; 5,760,962; 5,670,935; 5,877,897; 6,201,642; 6,396,397; 6,498,620; 6,717,610; 6,757,109 and/or 7,005,974, and/or of the automatic headlamp controls described in U.S. Pat. Nos. 7,526,103; 5,796,094 and/or 5,715,093, and/or of the rain sensors described in U.S. Pat. Nos. 6,250,148 and/or 6,341,523, and/or of other imaging systems, such as the types described in U.S. Pat. Nos. 6,353,392 and/or 6,313,454, with all of the above referenced U.S. patents being commonly assigned and being hereby incorporated herein by reference in their entireties. Optionally, a signal indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, which are hereby incorporated herein by reference in their entireties.

Optionally, the reflective element may include a first or principal reflecting portion and a second or auxiliary wide angle reflective element portion or reflective optic or spotter mirror, which may be integrally formed with the mirror reflective element, such as by utilizing aspects of the mirror assemblies described in U.S. Pat. Nos. 8,736,940; 8,021,005; 7,934,844; 7,887,204; 7,824,045 and/or 7,748,856, which are hereby incorporated herein by reference in their entireties. The auxiliary wide angle optic may be integrally formed such as by physically removing, such as by grinding or ablation or the like, a portion of the second surface of the front substrate so as to create or establish a physical dish-shaped generally convex-shaped depression or recess or crater at the second surface of the front substrate, and coating the formed depression or recess with a reflector coating or element or the like, such as described in U.S. Pat. No. 8,021,005, incorporated above. Optionally, a demarcating coating or layer may be established around a perimeter of the reflective element and around the spotter mirror, such as by utilizing aspects of the reflective elements described in U.S. Pat. Nos. 7,626,749; 7,274,501; 7,184,190 and/or 7,255,451, and/or U.S. Publication No. US-2006-0061008, which is hereby incorporated herein by reference in their entireties. Optionally, the mirror reflective element may comprise a frameless reflective element (such as a frameless exterior mirror assembly or a frameless interior mirror assembly), such as by utilizing aspects of the reflective elements described in U.S. Pat. Nos. 8,730,553; 8,508,831; 7,626,749; 7,360,932; 7,289,037; 7,255,451; 7,274,501 and/or 7,184,190, and/or U.S. Publication Nos. US-2006-0061008 and/or US-2006-0050018, which are hereby incorporated herein by reference in their entireties.

As discussed above, the rearview mirror reflective element assembly of the present invention may comprise an electro-optic or electrochromic reflective element assembly or cell, such as an electrochromic mirror reflective element assembly with coated substrates that are coated utilizing principles disclosed in commonly assigned U.S. Pat. Nos. 7,310,178; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, the cells manufactured by the process of the present invention may have generally or substantially flush edges or offset edges or overhang regions or the like, while remaining within the spirit and scope of the present invention, such as the types of cells described in U.S. Pat. Nos. 7,274,501; 7,184,190 and/or 7,255,451, which are hereby incorporated herein by reference in their entireties, or may have other forms or shapes, such as the mirror shapes described in U.S. Pat. No. 7,110,156, and/or shown in U.S. Design Pat. Nos. D493,131 and/or D493,394, which are hereby incorporated herein by reference in their entireties.

Changes and modifications in the specifically described embodiments may be carried out without departing from the principles of the present invention, which is intended to be limited only by the scope of the appended claims, as interpreted according to the principles of patent law.

The invention claimed is:

1. A rearview mirror reflective element assembly for an exterior rearview mirror assembly suitable for use on a vehicle, said mirror reflective element assembly comprising:

a mirror reflective element, wherein said mirror reflective element comprises an electro-optic mirror reflective element operable to vary its reflectivity of light responsive to an electrical voltage applied at said mirror reflective element;

a heater pad comprising a heater pad substrate having a plurality of electrically conductive traces established thereat;

wherein said electrically conductive traces comprise (i) a heating trace that, when powered, heats said heater pad substrate and said mirror reflective element, (ii) electro-optic control traces that, when electrically powered, darken said mirror reflective element, and (iii) an accessory trace that, when powered, controls an accessory of said mirror reflective element assembly;

wherein said electrically conductive traces terminate at a connector region of said heater pad substrate;

wherein said heater pad is disposed at a rear surface of said mirror reflective element;

a back plate formed by injection molding of a polymeric material;

wherein said heater pad is disposed between said mirror reflective element and said back plate;

wherein said back plate comprises a connector portion having electrically conductive elements that are electrically conductively connected at respective terminals of said electrically conductive traces of said heater pad;

wherein said connector portion is one of (i) insert molded in said back plate during injection molding to form said back plate and (ii) insert molded into a connector element attached at the heater pad;

wherein said connector portion is configured to electrically connect to a single wiring harness of the exterior rearview mirror assembly; and wherein said accessory trace, when powered, controls a blind zone indicator that is disposed at the rear of said mirror reflective element and that is viewable, when powered, through said mirror reflective element.

2. The rearview mirror reflective element assembly of claim 1, wherein said terminals of said electrically conductive traces comprise (i) a positive heating trace terminal, (ii) a positive electro-optic control trace terminal, (iii) a positive accessory trace terminal and (iv) a common negative terminal.

3. The rearview mirror reflective element assembly of claim 2, wherein said heater pad is adhered at the rear surface of said mirror reflective element.

4. The rearview mirror reflective element assembly of claim 3, wherein said connector portion comprises electrical contacts protruding rearward from said back plate for electrical connection to the wiring harness of the exterior rearview mirror assembly.

5. The rearview mirror reflective element assembly of claim 3, wherein said connector portion comprises electrical contacts extending parallel to said rear surface of said back plate for electrical connection to the wiring harness of the exterior rearview mirror assembly.

6. The rearview mirror reflective element assembly of claim 5, wherein said back plate forms a receiving connector for electrically connecting to a plug connector of the wiring harness of the exterior rearview mirror assembly.

7. The rearview mirror reflective element assembly of claim 3, wherein electrical contacts are established at said back plate as solder pads for at least one of (i) soldering individually to connecting wires of the wiring harness of the exterior rearview mirror assembly and (ii) using conductive epoxy to individually connect to wires of the wiring harness of the exterior rearview mirror assembly.

8. The rearview mirror reflective element assembly of claim 3, wherein said electro-optic mirror reflective element comprises an electrochromic mirror reflective element.

9. A rearview mirror reflective element assembly for an exterior rearview mirror assembly suitable for use on a vehicle, said mirror reflective element assembly comprising:
a mirror reflective element, wherein said mirror reflective element comprises an electro-optic mirror reflective element operable to vary its reflectivity of light responsive to an electrical voltage applied at said mirror reflective element;
a heater pad comprising a heater pad substrate having a plurality of electrically conductive traces established thereat;
wherein said electrically conductive traces comprise (i) a heating trace that, when powered, heats said heater pad substrate and said mirror reflective element, (ii) electro-optic control traces that, when electrically powered, darken said mirror reflective element, and (iii) an accessory trace that, when powered, controls an accessory of said mirror reflective element assembly;
wherein said electrically conductive traces terminate at a connector region of said heater pad substrate;
wherein said heater pad is adhered at a rear surface of said mirror reflective element;
a back plate formed by injection molding of a polymeric material;
wherein said heater pad is disposed between said mirror reflective element and said back plate;
wherein electrical contacts are established at said back plate and are electrically conductively connected with respective ones of said electrically conductive traces;
wherein said electrical contacts comprise pads configured for connecting wires of a wire harness of the exterior rearview mirror assembly thereto; and
wherein said accessory trace, when powered, controls a blind zone indicator that is disposed at the rear of said mirror reflective element and that is viewable, when powered, through said mirror reflective element.

10. The rearview mirror reflective element assembly of claim 9, wherein said pads are configured for connecting wires thereto by soldering.

11. The rearview mirror reflective element assembly of claim 9, wherein said pads are configured for connecting wires thereto using conductive epoxy.

12. The rearview mirror reflective element assembly of claim 9, wherein said electrical contacts are electrically conductively connected with respective terminals of said electrically conductive traces of said heater pad, and wherein said terminals of said electrically conductive traces comprise (i) a positive heating trace terminal, (ii) a positive electro-optic control trace terminal, (iii) a positive accessory trace terminal and (iv) a common negative terminal.

13. The rearview mirror reflective element assembly of claim 12, wherein said heater pad is adhered at the rear surface of said mirror reflective element.

14. The rearview mirror reflective element assembly of claim 13, wherein said electro-optic mirror reflective element comprises an electrochromic mirror reflective element.

15. A rearview mirror reflective element assembly for an exterior rearview mirror assembly suitable for use on a vehicle, said mirror reflective element assembly comprising:
a mirror reflective element;
a heater pad comprising a heater pad substrate having a plurality of electrically conductive traces established thereat;
wherein said electrically conductive traces comprise (i) a heating trace that, when powered, heats said heater pad substrate and said mirror reflective element, and (ii) an accessory trace that, when powered, controls an accessory of said mirror reflective element assembly;
wherein said electrically conductive traces terminate at a connector region of said heater pad substrate;
wherein said heater pad is disposed at a rear surface of said mirror reflective element;
a back plate formed by injection molding of a polymeric material;
wherein said heater pad is disposed between said mirror reflective element and said back plate;
wherein said back plate comprises a connector portion having electrically conductive elements that are electrically conductively connected at respective terminals of said electrically conductive traces of said heater pad;
wherein said connector portion is insert molded in said back plate during injection molding to form said back plate;
wherein said connector portion is configured to electrically connect to a single wiring harness of the exterior rearview mirror assembly; and
wherein said accessory trace, when powered, controls a blind zone indicator that is disposed at the rear of said mirror reflective element and that is viewable, when powered, through said mirror reflective element.

16. The rearview mirror reflective element assembly of claim 15, wherein said terminals of said electrically conductive traces comprise (i) a positive heating trace terminal, (ii) a positive accessory trace terminal and (iii) a common negative terminal.

17. The rearview mirror reflective element assembly of claim 16, wherein said connector portion comprises electrical contacts protruding rearward from said back plate for electrical connection to the wiring harness of the exterior rearview mirror assembly.

18. The rearview mirror reflective element assembly of claim 16, wherein said connector portion comprises electrical contacts extending parallel to said rear surface of said back plate for electrical connection to the wiring harness of the exterior rearview mirror assembly.

19. The rearview mirror reflective element assembly of claim 16, wherein said back plate forms a receiving connector for electrically connecting to a plug connector of the wiring harness of the exterior rearview mirror assembly.

20. The rearview mirror reflective element assembly of claim 16, wherein said blind zone indicator is disposed at the rear of said mirror reflective element.

* * * * *